Dec. 25, 1951 C. A. REES 2,580,321

HOOD BONDING CLIP

Filed May 20, 1948

INVENTOR.
Clarence A. Rees
BY
Moore, Olson & Trexler
Attys.

Patented Dec. 25, 1951

2,580,321

UNITED STATES PATENT OFFICE 2,580,321

HOOD BONDING CLIP

Clarence A. Rees, Chicago, Ill., assignor to Illinois Tool Works, Chicago, Ill., a corporation of Illinois Application May 20, 1948, Serial No. 28,182

4 Claims. (Cl. 173—324)

This invention is directed generally to electrical bonding clips and more specifically to yieldable sheet metal bonding clips of an improved design for insuring efficient electrical connection between associated parts of an automobile or the like.

The presence of electrical systems, such as automobile ignition systems in the vicinity of radio receivers often impairs the quality of reception of the receivers. This is particularly true with respect to television and frequency modulation receivers. To suppress the aforesaid electrical interference, suitable grounding of the entire automobile structure is necessary.

To this end, the invention contemplates a resilient bonding clip which is mounted between adjacently positioned parts for improving the electrical contact between these parts.

It is another object of the present invention to provide a bonding clip which is provided with a plurality of teeth or tabs presenting work engaging surfaces which are adapted for successive engagement with an automobile structure as the clip and structure are moved into contact with each other.

It is still another object of the present invention to provide a resilient bonding clip of the above described type which may be used to accommodate various degrees of spacing between separate work pieces.

It is still another object of the present invention to provide a bonding clip which is extremely simple in design and which may be manufactured with very little waste of material, thereby reducing the cost of manufacture.

These and other objects will be more fully understood by a study of the following detailed description and reference to the accompanying drawing wherein.

Figure 1:
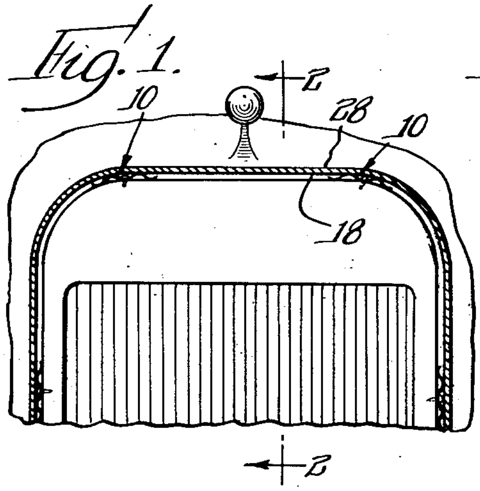
Figure 1 is a vertical, transverse, sectional view of an automobile hood having in association therewith a bonding clip which is representative of one embodiment of the invention.

Referring now to the drawing more in detail wherein like reference numerals have been used to designate like parts throughout the several views, it will be seen that the bonding clip which is designated generally by the numeral 10 consists of an elongated strip of metal 12. This strip is made of conductive material in order that it might serve its intended purpose, namely, as an electrical bonding medium. Intermediate the ends of the strip 12 an aperture 14 is provided to accommodate an anchoring device such as screw 16 for securing the strip to a supporting part 18. On opposite sides of the aperture 14 the strip is bowed or undulated to present arched portions 20. At the crests of arched portions 20 are provided apertures 22 which are peripherally defined by teeth 24. These teeth are preferably shaped or formed to have relatively sharp portions extending beyond the plane of strip 12. As shown in Figures 3 to 7, inclusive, these teeth have been deflected or twisted to present work engaging edges or surfaces which promote and insure better electrical contact, as will hereafter be more fully described.

By the provision of apertures 22 in the vicinity of the crest of the arched or bowed portions 20, the flexibility of the clip may be controlled. Thus, where the particular installation requires a very flexible or resilient clip, the size of the apertures 22 may be increased, thereby reducing the transverse, cross sectional area of material. Likewise, where the installation requires rigidity, the size of the aperture may be decreased. The free ends 26 of the strip 12 are preferably turned upwardly in the direction of the arched portions 20 to afford line contact with the work surface.

Figure 5:
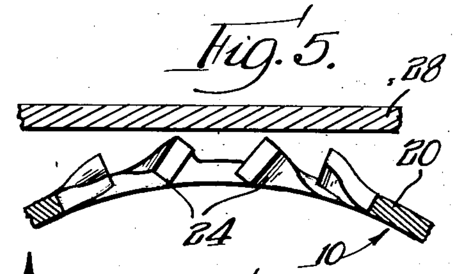
Figure 5 is an enlarged, fragmentary, longitudinal, sectional view showing the automobile hood spaced slightly from the bonding clip.
Figure 6:
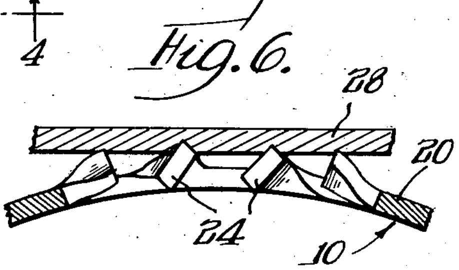
Figure 6 is a sectional view similar to Figure 5 showing initial contact of the bonding clip with the automobile hood.
Figure 7:
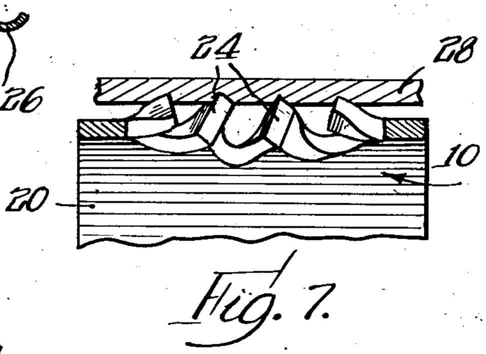
Figure 7 is a sectional view similar to Figures 5 and 6 disclosing the bonding clip finally tightened against the automobile hood so as to insure a perfect electrical bond.

The operation of the bonding clip is substantially as follows: After the bonding clip 10 is mounted on and secured to the supporting member 18 by means of the screw 16, the hood 28 is brought into contact with the crests of the bowed portions 20 of the clip. As the clamping or compressive force on the hood 28 is increased, the teeth 24 of the clip 10 successively embed themselves therein until all teeth 24 located in the vicinity of the crest of the arched portion 20 of the clip contact the hood 28. Figures 5 to 7, inclusive, show the successive stages of the operative association of the hood 28 with the clip 10. In Figure 5, the teeth 24 of the arched portion 20 are shown adjacent to but not in contact with the hood 28. Figure 6 shows the initial contacting with the hood 28 of the teeth adjacent the axis of the aperture 22. In this position these teeth become embedded within the material of the hood and the remaining teeth make relatively light contact with the hood. Figure 7 shows the final clamped position of the parts with all of the teeth completely embedded in the hood 28. Thus the resiliency of the clip insures proper tooth contact and the consequent establishment of an efficient electrical bond.

Figure 2:
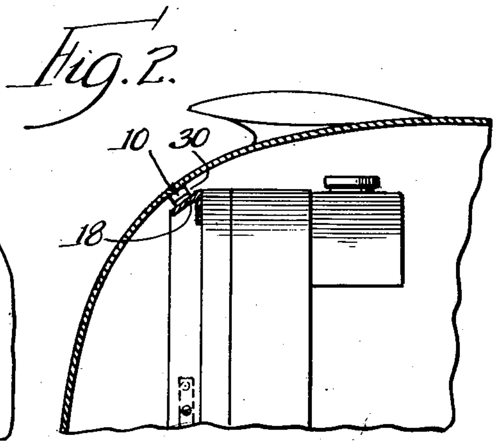
Figure 2 is a longitudinal, sectional view of the automobile hood taken substantially along line 2—2 in Figure 1 for the purpose of illustrating the bonding clip of the present invention in assembled position.
Figure 3:
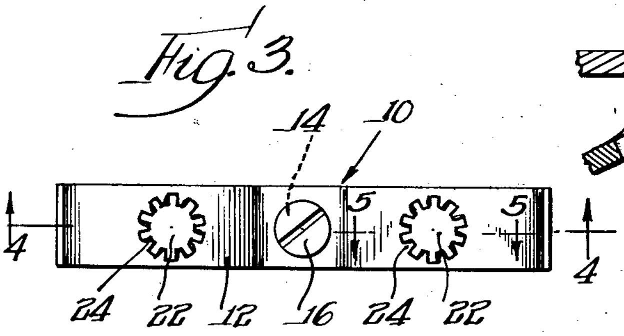
Figure 3 is a plan view of the bonding clip.

In installations where the clip 10 is mounted within a cushioning channel 30, as shown in Figure 2, it is obvious that the screw 16 will of necessity be made of a conductive material to complete the electrical connection from the clip 10 to the supporting surface 18. When the clip is mounted in contact with the supporting surface 18, this problem does not present itself.

Figure 4:
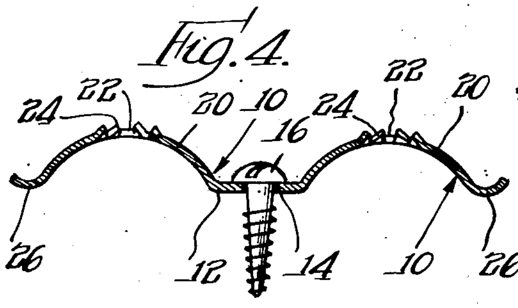
Figure 4 is a longitudinal, sectional view of the bonding clip taken along the line 4—4 in Figure 3.

It will be apparent from the foregoing explanation that when the bonding clip is tightened in position it has a tendency to flatten and elongate. Hence the free opposite extremities 26 must slide along the work surface. It is desirable therefore to turn up these extremities as shown in Figure 4 so as to present a curved surface to the work surface. This provides line contact between the clip and work surface, materially reducing frictional resistance to flattening. These turned up portions also preclude the presence of sharp corners or edges. It is essential that such corners or edges be eliminated if the clip is to be used with soft or impressionable material such as rubber or the like.

Figures 8, 9:
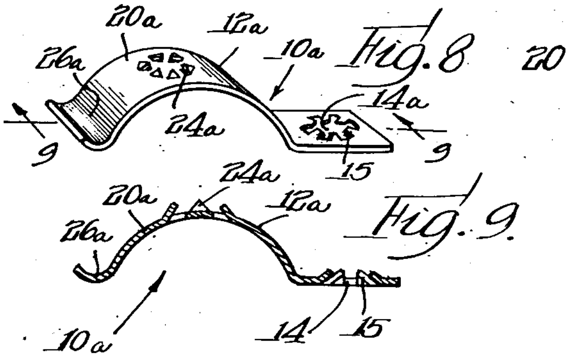
Figure 8 is a perspective view of a modified form of the hood bonding clip contemplated by the invention.
Figure 9 is a longitudinal, sectional view of the modified form of hood bonding clip shown in Figure 8 and taken substantially along the line 9—9 of Figure 8.

Figures 8 and 9 show a modified form of a bonding clip designated generally as 10*a*, formed from a strip of material 12*a*. Adjacent one end is an aperture 14*a* which is defined by a plurality of inwardly extending teeth 15. These teeth are preferably formed or shaped to present edges which extend beyond opposite surfaces of the strip 12*a*. Aperture 14*a* is adapted to receive a screw 16*a*, not shown, for securing the clip 10*a* to a supporting structure. Teeth 15, by having portions which extend beyond the opposite surfaces of the strip 12*a* serve, as would a lock washer, to resist unauthorized loosening or retrograde rotation of the screw. Also, it insures an electrical contact between the screw 16*a* and the supporting piece 18*a* and this is important in instances where the surfaces of the supporting part and screw are painted or coated with grease.

Intermediate aperture 14*a* and the opposite free end 26*a* of the strip 12*a*, the strip 12*a* is bent to provide an arched portion 20*a*. These arched portions, which vary in size and number are provided on their crests with a plurality of struck out tabs or teeth 24*a*. Teeth 24*a* are adapted to successively contact the work piece such as the hood in a manner similar to that heretofore described in reference to the clip 10. The free end 26*a* is preferably upturned so as to provide line contact with the supporting piece and thereby facilitate elongation of the clip when it is flattened.

From the foregoing it is apparent that the novel bonding clip contemplated by this invention is capable of being produced very inexpensively by employing simple and well known manufacturing methods. The clip, by reason of its resilient character, is adaptable for use between variously spaced work pieces. Furthermore, the arrangement of the teeth or tabs at the crest of the arched portions affords efficient contact portions, and by successively contacting a work surface as compressive force against the clip effective electrical bonding is insured. Also, locating the aperture at the crest of the arched portion of the clip makes it possible to control the degree of resiliency of the fastener by varying the size of the aperture.

While for purposes of disclosure, only two embodiments of the invention have been shown, it is to be understood that various changes may be made without departing from the spirit and scope of the invention.

The invention is hereby claimed as follows:

1. An electrical bonding clip structure adapted to be compressed between opposed work parts and comprising a strip of electrically conductive sheet metal including an arched section, a plurality of teeth struck outwardly from the crest of said arched section and adapted aggressively to impinge a first work part pressed thereagainst, an attaching section connected to one end of said arched section and apertured to accommodate an anchoring member for attaching said clip structure to a second work part spaced from the first work part, and a rounded work engaging surface formed on the other end of said arched section and adapted to bear against a work part spaced from the first work part.

2. An electrical bonding clip structure adapted to be compressed between opposed work parts and comprising a resilient strip of electrically conductive sheet metal having an intermediate arched section terminating in an attaching end section and a free end section, a plurality of teeth struck outwardly from the crest portion of said arched section and disposed on opposite sides of the transverse apex line thereof and adapted for aggressive impingement against a first work part, said attaching end section being apertured to receive an anchoring member for securing the clip structure to a second work part and said free end section being slidable outwardly of the crest portion on a supporting surface as the clip structure is compressed between the work parts and effective to permit a flattening of the crest portion of the arched section whereby to impinge the teeth on opposite sides of the transverse apex line thereof against the said first work part.

3. An electrical bonding clip structure as claimed in claim 2, wherein the end sections of the strip are disposed in substantially the same plane and spaced from the plane of the crest portion of the arched section when in unstressed condition, but permitting the clip structure to be employed between variously spaced work parts.

4. An electrical bonding clip structure as claimed in claim 2, wherein the crest portion of the arched section is apertured and wherein the teeth are disposed substantially peripherally of the aperture, the size of said aperture within the teeth being in accordance with the required flexibility of the strip.

CLARENCE A. REES.

REFERENCES CITED

The following references are of record in the file of this patent:

UNITED STATES PATENTS

| Number | Name | Date |
|---|---|---|
| 1,135,717 | Price | Apr. 13, 1915 |
| 1,874,593 | Olson | Aug. 30, 1932 |
| 2,108,530 | Ellis | Feb. 15, 1938 |

FOREIGN PATENTS

| Number | Country | Date |
|---|---|---|
| 478,263 | England | Jan. 17, 1938 |